(12) United States Patent
Radmard et al.

(10) Patent No.: US 8,142,012 B2
(45) Date of Patent: Mar. 27, 2012

(54) EYEGLASSES

(76) Inventors: Ramak Radmard, Lachine (CA);
Michael Toulch, Cote-St-Luc (CA)

( * ) Notice: Subject to any disclaimer, the term of this patent is extended or adjusted under 35 U.S.C. 154(b) by 0 days.

(21) Appl. No.: 13/064,099

(22) Filed: Mar. 7, 2011

(65) Prior Publication Data

US 2011/0242479 A1 Oct. 6, 2011

Related U.S. Application Data

(63) Continuation-in-part of application No. 12/382,019, filed on Mar. 6, 2009, now abandoned.

(60) Provisional application No. 61/064,473, filed on Mar. 7, 2008, provisional application No. 61/282,603, filed on Mar. 5, 2010.

(51) Int. Cl.
*G02C 1/02* (2006.01)
(52) U.S. Cl. ........................................................ 351/110
(58) Field of Classification Search .................. 351/110, 351/124, 41, 140, 113, 115, 153; 16/228
See application file for complete search history.

(56) References Cited

U.S. PATENT DOCUMENTS

| | | | | | |
|---|---|---|---|---|---|
| 2,746,087 | A | * | 5/1956 | Dolezal | 264/294 |
| 6,033,069 | A | * | 3/2000 | Lee | 351/113 |
| 6,050,686 | A | * | 4/2000 | De Rossi | 351/153 |
| 6,068,375 | A | * | 5/2000 | LeBrun et al. | 351/113 |

* cited by examiner

*Primary Examiner* — Hung Dang

(57) ABSTRACT

Eyeglasses, the eyeglasses defining substantially opposed lateral sides, the eyeglasses comprising: a pair of lenses provided in a substantially side-by-side relationship relative to each other between the eyeglasses lateral sides; a pair of connectors each provided substantially adjacent a respective one of the eyeglasses lateral sides; and a pair of side arms, each of the side arms being pivotally coupled to a respective one of the connectors so as to be pivotable in a side arm pivoting plane to a closed, an opened, an extended and a released configuration. In the closed configuration, the side arms are each substantially adjacent and substantially parallel to the lenses. In the opened configuration, the side arms extend substantially perpendicular to the lenses. In the released configuration, the side arms are located opposite to the lenses relatively to the connector and are substantially freely pivotable in the side arm pivoting plane. In the extended configuration, the side arms are between the opened and released configurations and are biased toward the opened configuration.

18 Claims, 10 Drawing Sheets

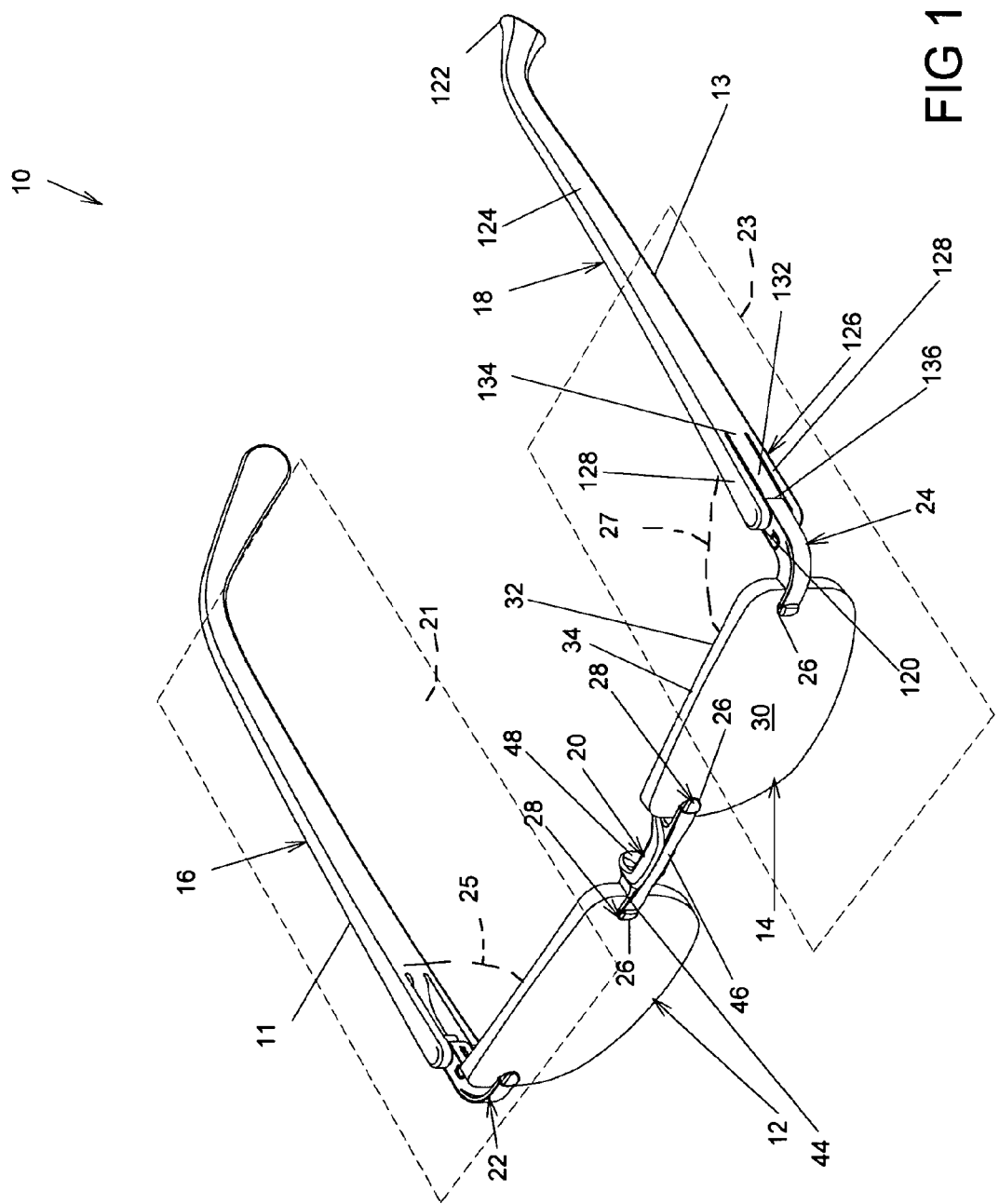

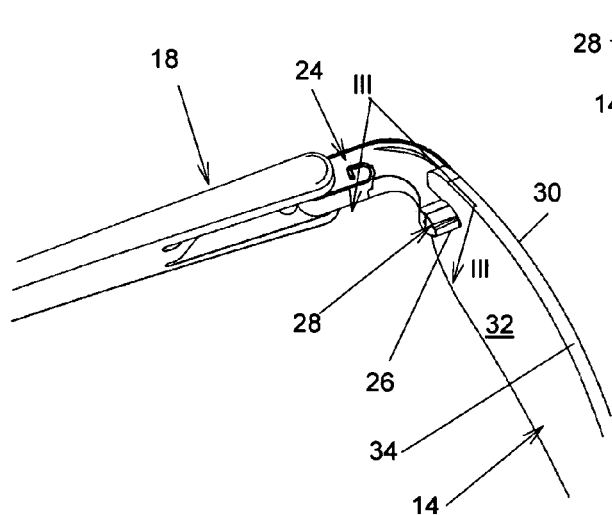
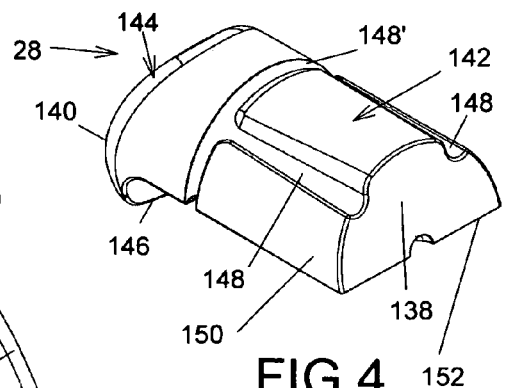
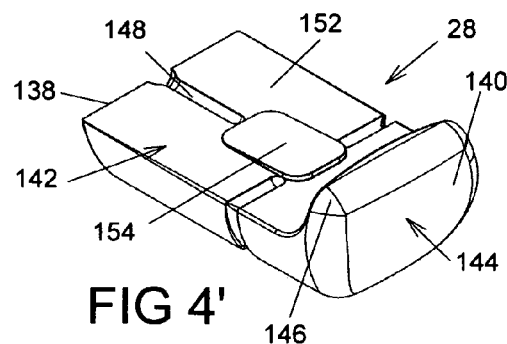
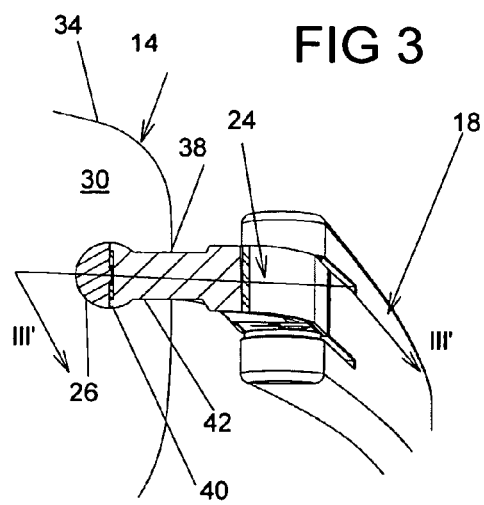
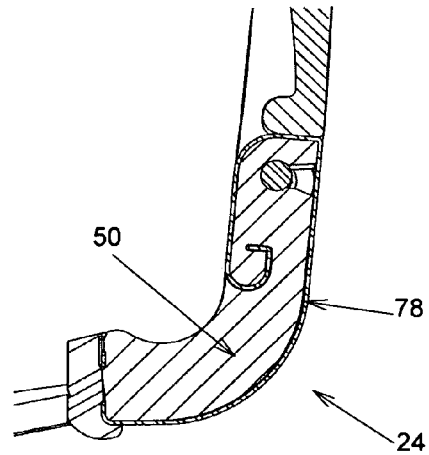

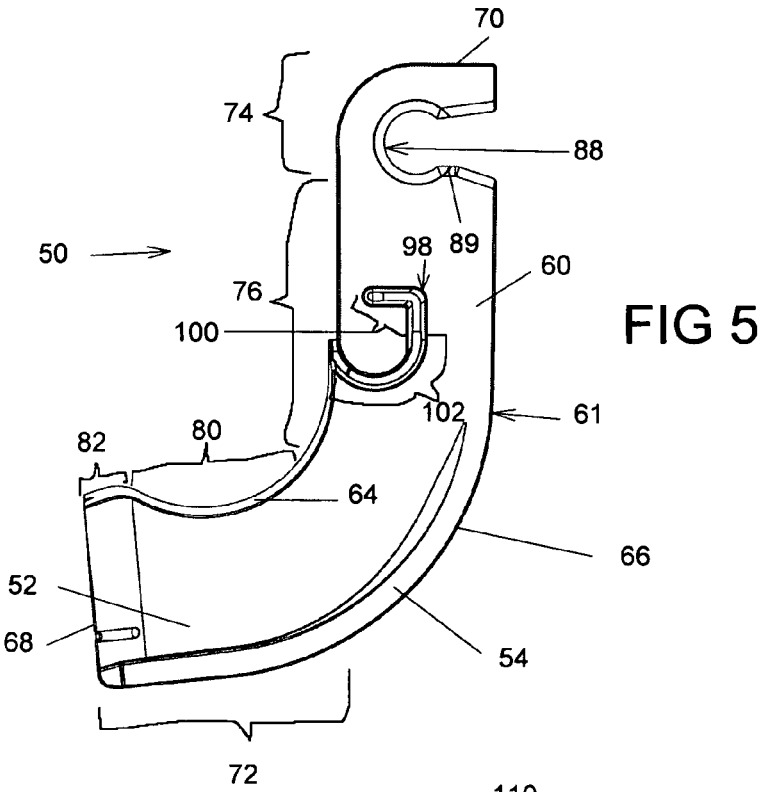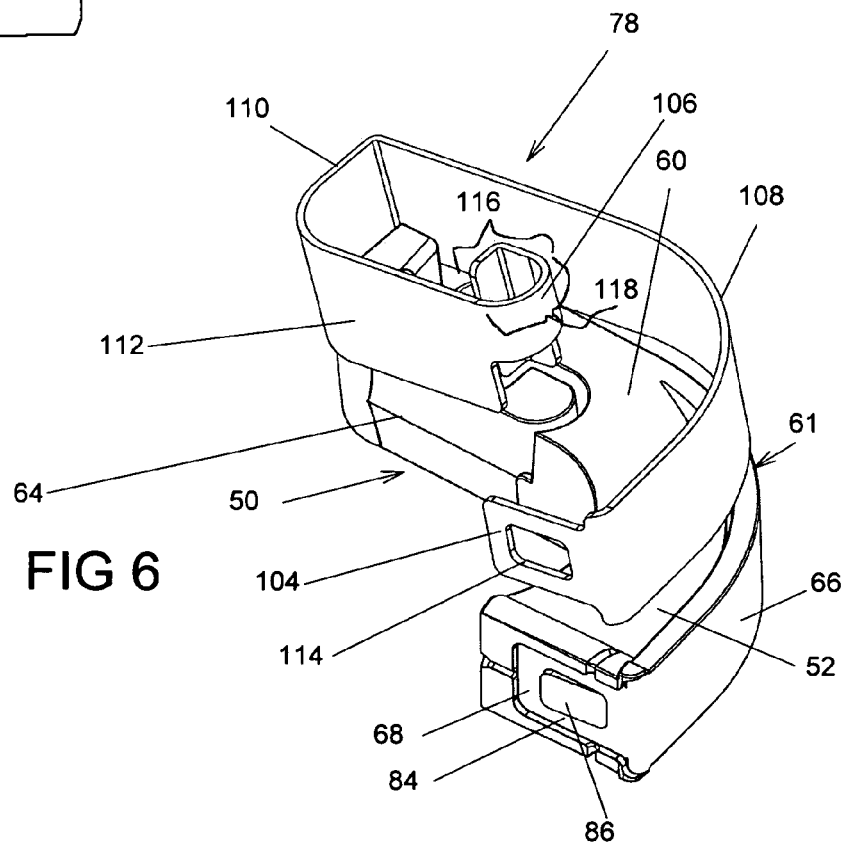

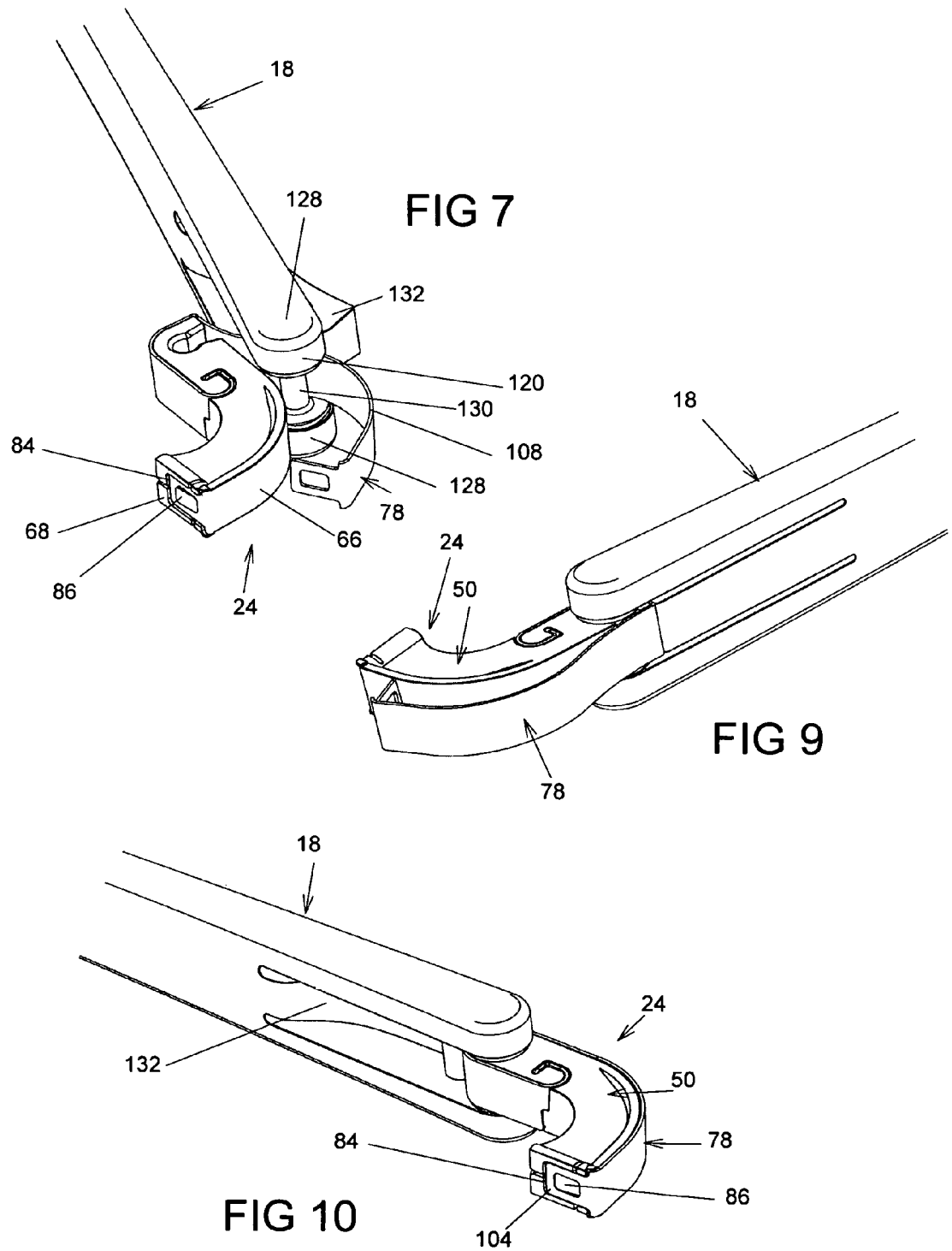

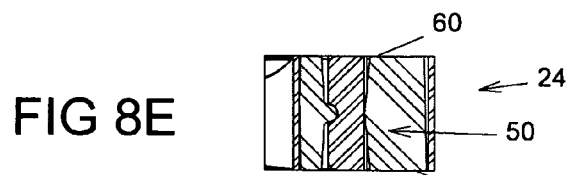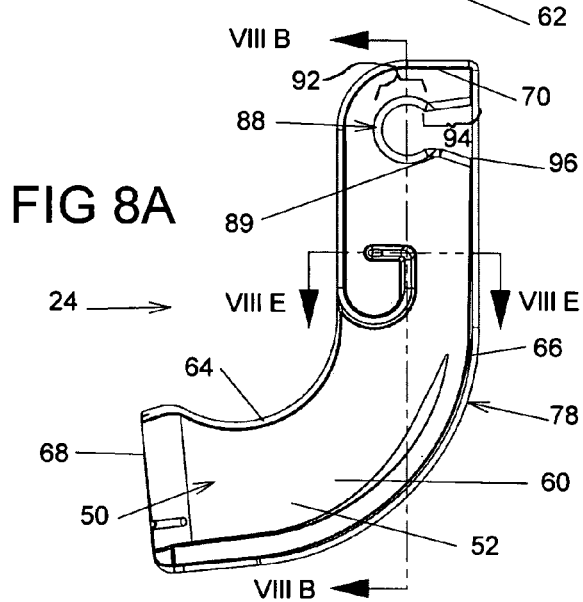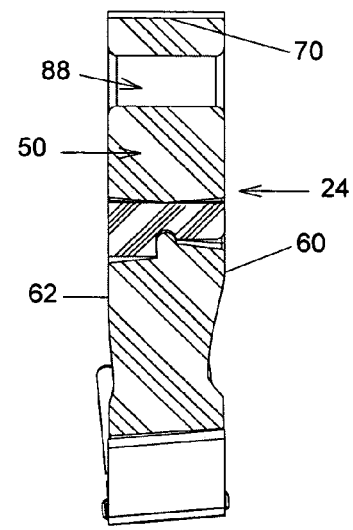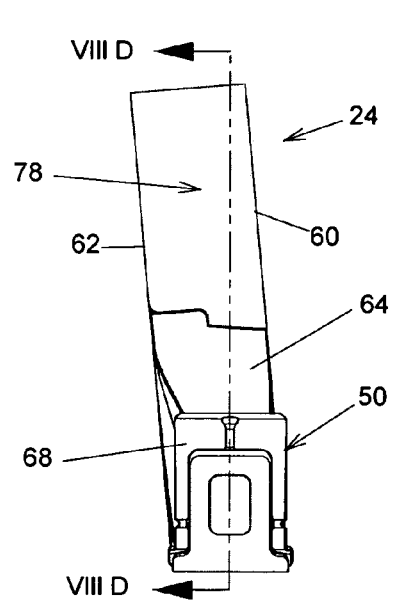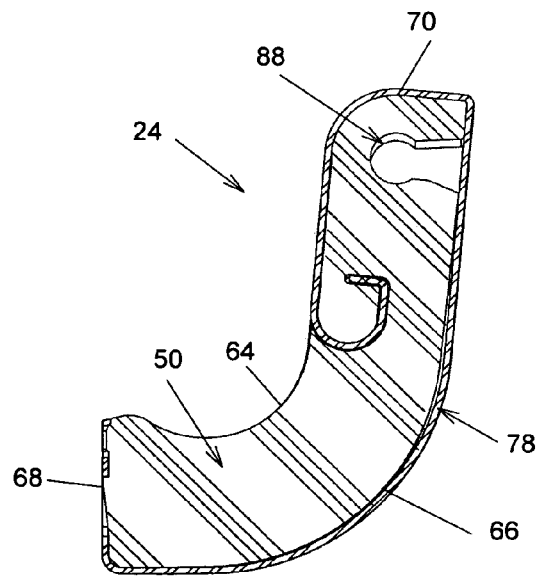

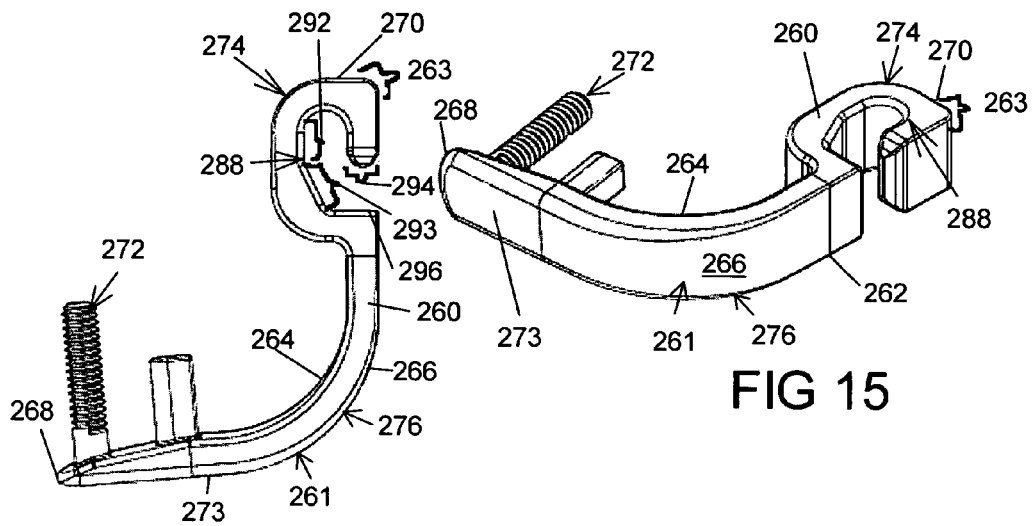
FIG 14
FIG 15
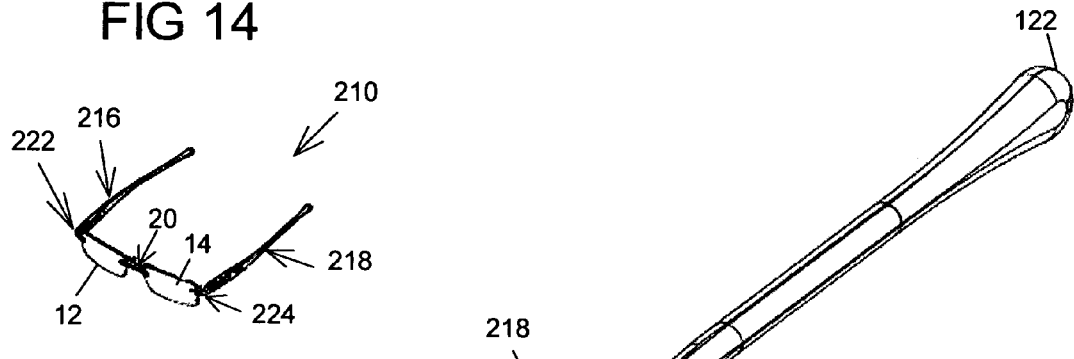
FIG 13
FIG 16
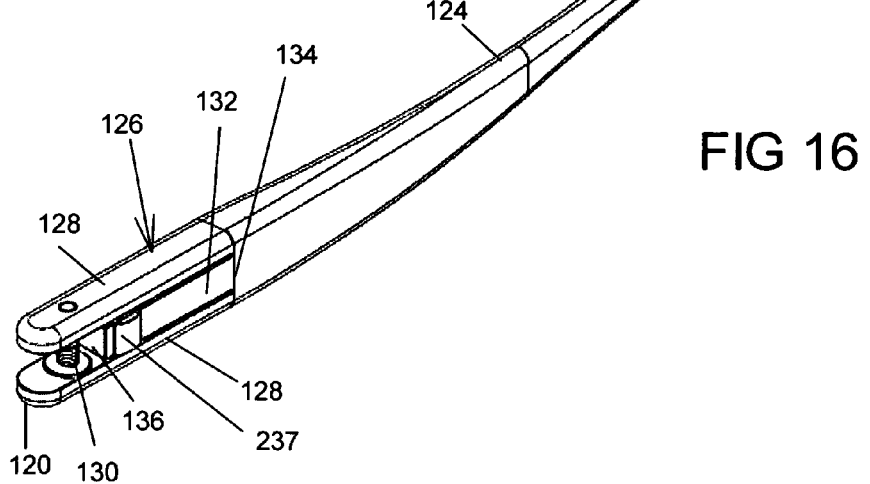

EYEGLASSES

This application is a continuation in part of U.S. patent application Ser. No. 12/382,019 filed on Mar. 6, 2009, now abandoned, which application claims priority from U.S. Provisional Patent Application Ser. No. 61/064,473 filed Mar. 7, 2008. This application also claims priority from U.S. Provisional Patent Application Ser. No. 61/282,603 filed Mar. 5, 2010.

FIELD OF THE INVENTION

This invention relates generally to the field of eyeglasses.

BACKGROUND OF THE INVENTION

There is a multitude of eyeglasses models produced. However, despite numerous efforts by many inventors, currently commercialized eyeglasses have many drawbacks.

For example, a type of eyeglasses that is relatively popular is rimless eyeglasses. Instead of having a rim into which lenses are inserted, these eyeglasses include lenses that are attached to each other through a bridge, the bridge including a nose pad. Also, side arms are attached directly to the lenses. However, in this type of eyeglasses, there is a need to prepare the lenses so that these components can be attached thereto. This typically requires the use of specialized tooling and needs to be done carefully with a relatively large precision so that the eyeglasses are aesthetically pleasant, comfortable to wear by the intended user and present suitable optical characteristics.

Furthermore, the bridge and side arms are typically attached using small screws or small nuts and bolts, which are relatively fragile, and which also sometimes require the use of locking glue to prevent the screw/bolt from detaching from the remainder of the eyeglasses. Also, these screws and bolts are relatively small and fragile and therefore require great dexterity from an optician who needs to attach these components to the eyeglasses. In the case in which glue is used, it is typically difficult to remove the components for replacement once they have been attached to a lens. Therefore, in cases in which the intended user needs to change one of the components of the eyeglasses, new lenses typically need to be ordered, which can be relatively expensive and cause a delay during which the intended user is not able to use the eyeglasses.

Furthermore, it often occurs that unintended forces are exerted onto the side arms of the eyeglasses, for example in cases in which an impact occurs while the intended user wears the eyeglasses. To that effect, many models of eyeglasses include side arms that can open outwardly over some range to allow the eyeglasses to deform upon impact. However, to ensure proper comfort of the intended user and stability of the eyeglasses onto the head of the intended user, these eyeglasses require that the side arms do not open too easily, which contradicts the requirements that deformation occurs easily to minimize damages. In addition, these prior art eyeglasses have side arms that are only allowed to open up over a relatively small range of angles.

Yet furthermore, many types of eyeglasses have interchangeable parts, such as interchangeable side arms. The side arms typically include an attachment section that is removably insertable in a suitably shaped cavity, channel or recess. However, the link between the side arms and the remainder of the eyeglasses is often relatively fragile. Furthermore, many currently existing systems can lead in normal use to detachment of the side arm from the remainder of the eyeglasses. Finally, attachment and detachment of the side arm can be a relatively difficult to perform process, which can deter many potential customers.

Against this background, there exists a need in the industry to provide novel eyeglasses.

An object of the present invention is therefore to provide improved eyeglasses.

SUMMARY OF THE INVENTION

In a broad aspect, the invention provides a lens and eyeglasses component assembly, the lens and eyeglasses component assembly comprising: a lens, the lens defining a lens first surface, a substantially opposed lens second surface and a lens peripheral surface extending therebetween, the lens also defining a lens aperture extending between the lens first and second surfaces, the lens aperture being located adjacent the lens peripheral surface and defining a lens gap in the lens peripheral surface leading thereinto, the lens aperture defining a lens aperture peripheral surface; an eyeglasses component, the eyeglasses component defining a lens attachment portion inserted in the lens aperture; and a locking component inserted in the lens aperture, the locking component frictionally engaging both the lens aperture peripheral surface and the lens attachment portion; whereby the locking component attaches the eyeglasses component to the lens.

For example, the lens and component assembly includes many components such as a bridge element including a nose pad interconnecting two lenses and two side arms attached each to a respective one of the lenses through a connector.

In some embodiments of the invention, the locking component defines a groove into which glue is insertable to secure the locking component, and consequently the eyeglasses component, to the lens. However, in alternative embodiments of the invention, no glue is used for locking the lens and the locking component to each other.

Advantageously, the proposed lens and component assembly is relatively easily assembled and allows for the replacement of the component attached to the lens with minimal damages to the lens.

In some embodiments of the invention, the eyeglasses include side arms that are operable between a closed, an opened and a released configuration. In the closed configuration, the side arms are substantially adjacent and substantially parallel to the lenses. In this configuration, the eyeglasses can be carried by the intended user in a relatively compact configuration. In the opened configuration, the side arms extend substantially perpendicular to the lenses. In this configuration, the eyeglasses can be worn by the intended user in a conventional manner. In the released configuration, the side arms are located opposite to the lenses relatively to the connector and extend at an angle larger than 90 degrees relatively to the lenses. This configuration is achieved, for example, when an impact or any other forces tending to open the side arms to a larger extent than the opened configuration are exerted onto the eyeglasses.

In some embodiments of the invention, the side arms are movable to an extended configuration occurring between the opened and released configurations. In the extended configuration, the side arms are biased against further opening of the side arms by a biasing element. As the side arms are opened further away from the closed position that the opened configuration, the biasing element biases the side arms toward the opened configuration until a predetermined angle between the lenses and the side arms has been achieved. The predetermined angle is typically achieved when a predetermined force is applied to the side arm. After this predetermined angle has been achieved, the biasing component no longer biases the side arms and the side arms are free to rotate in the released configuration.

Advantageously, the proposed side arms are relatively comfortable to the intended user and allow for adjustment of the eyeglasses to heads having slightly different dimensions without causing undue discomfort to the intended user. For example, the side arms do not exert undue pressure on the temples of the intended user when worn. The side arms also allows for small movements of the eyeglasses relatively to the head of the intended user without causing any damages to the eyeglasses and simultaneously exert a biasing force tending to centre the eyeglasses on the head of the intended user. When the side arms are moved at a position further away from the lenses than the predetermined angle, the side arms are free to rotate away from the lenses, thereby preventing or, at least, reducing the risk of damaging the eyeglasses when relatively large forces are exerted onto the side arms, as well as increasing the safety of the eyeglasses.

In another broad aspect the invention provides eyeglasses, the eyeglasses defining substantially opposed eyeglasses lateral sides, the eyeglasses comprising: a pair of lenses provided in a substantially side-by-side relationship relative to each other between the eyeglasses lateral sides; a pair of connectors each provided substantially adjacent a respective one of the eyeglasses lateral sides; and a pair of side arms, each of the side arms being pivotally coupled to a respective one of the connectors so as to be pivotable in a respective side arm pivoting plane, the side arms defining each a respective side arm-to-lens angle in the respective side arm pivoting plane between the side arms and the lenses. The side arms are each pivotable in the side arm pivoting plane over a respective side arm range of motion, the side arm range of motion defining a first, a second and a third angle interval. The side arms are substantially freely pivotable when the side arm-to-lens angle is in the first angle interval. The second angle interval includes angles larger than angles of the first angle interval and the side arm is biased toward the first angle interval when the side arm-to-lens angle is in the second angle interval. The third angle interval includes angles larger than angles in the second angle interval and the side arm is substantially freely pivotable when the side arm-to-lens angle is in the third angle interval.

In another broad aspect the invention provides eyeglasses, the eyeglasses defining substantially opposed eyeglasses lateral sides, the eyeglasses comprising: a pair of lenses provided in a substantially side-by-side relationship relative to each other between the eyeglasses lateral sides; a pair of connectors each provided substantially adjacent a respective one of the eyeglasses lateral sides; and a pair of side arms, each of the side arms being pivotally coupled to a respective one of the connectors so as to be pivotable in a side arm pivoting plane to a closed, an opened, an extended and a released configuration. In the closed configuration, the side arms are each substantially adjacent and substantially parallel to the lenses. In the opened configuration, the side arms extend substantially perpendicular to the lenses. In the released configuration, the side arms are located opposite to the lenses relatively to the connector and are substantially freely pivotable in the side arm pivoting plane. In the extended configuration, the side arms are between the opened and released configurations and are biased toward the opened configuration.

In some embodiments of the invention, the connector connecting the side arms to the eyeglasses is composite and includes a body made out of a polymer over which a metal strip is wrapped. This composite nature allows for manufacturing a relatively small and light connector at relatively low costs, while increasing the sturdiness of the connector through the use of the metal strip. Also, in some embodiments of the invention, the metal strip is used to provide a highlight onto the eyeglasses which enhances the aesthetics of the eyeglasses. Furthermore, in some embodiments of the invention, the metal strip also serves to retain the side arm attached to the connector in the released configuration.

While the present document is mainly concerned with rimless eyeglasses, many of the concepts described herein are also applicable to rimmed eyeglasses.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

FIG. 1, in a perspective view, illustrate eyeglasses in accordance with an embodiment of the present invention;

FIG. 2, in a partial alternative perspective view, illustrates the eyeglasses shown in FIG. 1;

FIG. 3, in a cross-sectional view taken along the line III-III of FIG. 2, illustrates the eyeglasses shown in FIGS. 1 and 2;

FIG. 3', in an alternative cross-sectional view taken along the line III'-III' of FIG. 2, illustrates the eyeglasses shown in FIGS. 1 to 3;

FIG. 4, in a perspective view, illustrates a locking component part of the eyeglasses shown in FIGS. 1 to 3;

FIG. 4', in an alternative perspective view, illustrates the locking component shown in FIG. 4;

FIG. 5, in a top elevation view, illustrates a connector body of a connector part of the eyeglasses shown in FIGS. 1 to 3;

FIG. 6, in a perspective exploded view, illustrates a connector part of the eyeglasses shown in FIGS. 1 to 3;

FIG. 7, in a perspective view, illustrates a step in the assembly of a side arm part of the eyeglasses shown in FIGS. 1 to 3 with the connector shown in FIG. 6;

FIG. 8A, in a top plan view, illustrates the connector shown in FIG. 6;

FIG. 8B, in a side cross-sectional view along the line VIIIB-VIIIB of FIG. 8A, illustrates the connector shown in FIGS. 6 and 8A;

FIG. 8C, in a side elevation view, illustrates the connector shown in FIGS. 6, 8A and 8B;

FIG. 8D, in a side cross-sectional view along the line VIIID-VIIID of FIG. 8C, illustrates the connector shown in FIGS. 6 and 8A-8C;

FIG. 8E, in a side cross-sectional view along the line VIIIE-VIIIE of FIG. 8A, illustrates the connector shown in FIGS. 6 and 8A-8D;

FIG. 9, in a perspective view, illustrates another step in the assembly of the side arm part shown in FIG. 7 with the connector shown in FIG. 6;

FIG. 10, in a perspective view, illustrates another step in the assembly of the side arm part shown in FIG. 7 with the connector shown in FIG. 6;

FIG. 13, in a perspective view, illustrate eyeglasses in accordance with an alternative embodiment of the present invention;

FIG. 14, in a top elevation view, illustrates a connector usable in the eyeglasses shown in FIG. 13;

FIG. 15, in a perspective view, illustrates the connector shown in FIG. 14;

FIG. 16, in a perspective view, illustrates a side arm part of the eyeglasses shown in FIG. 1 and removably attachable to the connector shown in FIGS. 14 and 15;

DETAILED DESCRIPTION

Figure 11A:
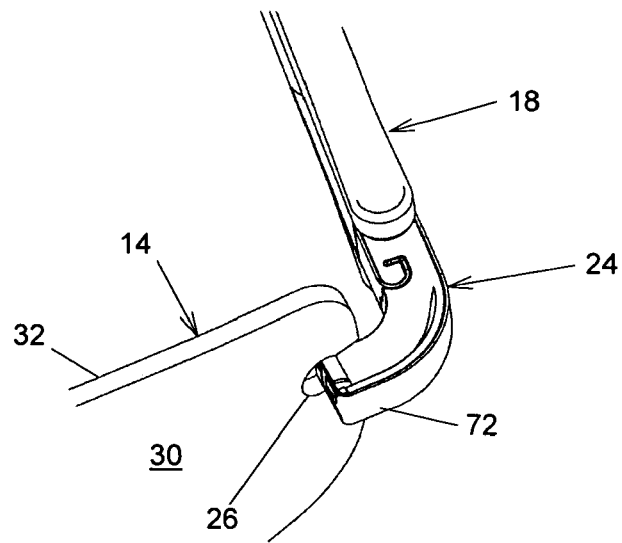
FIGS. 11A to 11C, in partial perspective views, illustrate successive steps in the attachment of the connector shown in FIGS. 6-10 to the lenses of the eyeglasses shown in FIGS. 1 and 2.

Referring to FIG. 1, there is shown a pair of eyeglasses 10 defining substantially opposed eyeglasses lateral sides 11 and 13. The eyeglasses 10 include two lenses 12 and 14 disposed in a side by side relationship relatively to each other between the eyeglasses lateral sides 11 and 13. Side arms 16 and 18 are each connected respectively to one of the lenses 12 and 14 and located substantially opposed to each other relatively to the lenses 12 and 14. A bridge element 20 extends between the lenses 12 and 14. The side arms 16 and 18 are attached respectively to the lenses 12 and 14 by a respective connector 22 and 24, each provided substantially adjacent a respective one of the eyeglasses lateral sides 11 and 13. The side arms 16 and 18, along with the bridge element 20, are eyeglasses components that are attachable to the lenses 12 and 14.

The side arms 16 and 18 are pivotally coupled to a respective one of the connectors 22 and 24 so as to be pivotable in a respective side arm pivoting plane 21 and 23, which typically extend respectively generally perpendicularly to the lenses 12 and 14. The side arms 16 and 18 define each a respective side arm-to-lens angle 25 and 27 in their respective side arm pivoting plane 21 and 23 between the side arms 16 and 18 and the lenses 12 and 14. The side arms 16 and 18 are also removably attachable to the connectors 22 and 24.

The side arms 16 and 18 are each pivotable in their respective side arm pivoting plane 21 and 23 over a respective side arm range of motion. The side arm range of motion defines a first, a second and a third angle interval. The side arms 16 and 18 are substantially freely pivotable when the side arm-to-lens angle 25 and 27 is in the first angle interval. The second angle interval includes angles larger than angles of the first angle interval and the side arms 16 and 18 are biased toward the first angle interval when the side arm-to-lens angle 25 and 27 are in the second angle interval. The third angle interval includes angles larger than angles in the second angle interval and the side arms 16 and 18 are substantially freely pivotable when the side arm-to-lens angle is in the third angle interval.

Referring to FIG. 2, the attachment between the lens 14 and the connector 24 is illustrated in greater details. The lens 12 is attached to the connector 22 in a similar manner and this attachment is therefore not described in further details herein. The lens 14 defines a lens first surface 30 and a lens second surface 32. The lens second surface 32 is substantially opposed to the lens first surface 30 and a lens peripheral surface 34 extends between the lens first and second surfaces 30 and 32. As seen in FIG. 1, the lens 14 defines two substantially opposed lens apertures 26, each extending between the lens first and second surfaces 30 and 32. The lens apertures 26 are substantially diametrically opposed to each other and are usable for attaching the bridge element 20 and the connectors 22 and 24 to the lenses 12 and 14, as described in further details hereinbelow. As better seen in FIG. 3, each of the lens apertures 26 is located adjacent the lens peripheral surface 34 and defines a lens gap 38 in the lens peripheral surface 34. The lens gap 38 leads into the lens aperture 26.

Each of the lens apertures 26 defines an aperture inner portion 40 and an aperture outer portion 42. The aperture outer portion 42 is located closer to the lens peripheral surface 34 than the aperture inner portion 40. The aperture inner portion 40 extends from the aperture outer portion 42 and the aperture outer portion 42 extends from the lens gap 38. Typically, the aperture outer portion 42 has a substantially rectilinear and parallelepiped-shaped configuration, while the aperture inner portion 40 has a substantially cylindrical configuration. However, other configurations of the aperture inner and outer portions 40 and 42 are within the scope of the invention. Typically, the aperture inner portion 40 has a diameter that is larger than the width of the lens gap 38.

Generally speaking, each of the components that are attachable to the lenses 12 and 14, such as the connectors 22 and 24 and the bridge element 20, defines a lens attachment portion insertable into the lens aperture 26. A locking component 28 is also inserted also in the lens aperture 26. The locking component 28 frictionally engages both the lens aperture peripheral surface 36 and the lens attachment portion of the component inserted into the lens aperture 26. The locking component 28 attaches the eyeglasses components to the lenses 12 and 14. Also, in some embodiments of the invention, the locking component 28 mechanically engages the lens attachment portion to provide an interference between these two components and enhance the locking action of the locking component.

More specifically, as seen in FIG. 1, the bridge element 20 includes two substantially opposed bridge lens attachment 44, a bridge body 46 extending between the bridge lens attachments 44 and a nose pad 48 extending from the bridge body 46. The bridge body 46 and the nose pad 48 are conventional and will therefore not be described in further details. The bridge lens attachment 44 is similar in shape and function to a connector lens attachment 72 that is described in further details hereinbelow. Therefore, the bridge lens attachment 44 will also not be described in further details.

FIGS. 5, 6, 7 and 8A-8E illustrate in greater details the connector 24. The connector 22 is similar to the connector 24 and is therefore not described in further details. The connector 24 includes a generally L-shaped connector body 50 defining a connector top surface 60, a substantially opposed connector bottom surface 62, a connector outer surface 66 extending between the connector top and bottom surfaces 60 and 62, a connector inner surface 64 extending also between the connector bottom and top surfaces 60 and 62 and two substantially opposed connector first and second end surfaces 68 and 70 also each extending between the connector top and bottom surfaces 60 and 62. The connector outer surface 66, inner surface 66, first end surface 68 and second end surface 70 together form a connector peripheral surface 61 extending between the connector top and bottom surfaces 60 and 62. The connector inner and outer surfaces 64 and 66 are substantially opposed to each other and each extend between the connector first and second end surfaces 68 and 70. In some embodiments of the invention, the connector second end and inner surfaces 70 and 64 merge together in a substantially arcuate configuration and the connector second end and outer surfaces 70 and 66 merge together in a substantially corner-shaped configuration.

The connector outer surface 66 face laterally outwardly relatively to the lenses 12 and 14 when the eyeglasses 10 are assembled. The connector inner surface 64 faces laterally inwardly relatively to the lenses 12 and 14 when the eyeglasses 10 are assembled. Therefore, the connector inner surfaces 64 of connectors 22 and 24 face each other when the eyeglasses 10 are assembled. The connector first end surface 68 is located in the lens aperture 26 when the eyeglasses 10 are assembled.

The reader skilled in the art will readily appreciate that directional terminology such as top, bottom and lateral, for example, is used in this document to facilitate the description of the eyeglasses 10 and refer to orientations relative to the eyeglasses 10 when the eyeglasses 10 are worn in a conventional manner by an upstanding intended user (not shown in the drawings). However, the use of this directional terminology should not be used to restrict the scope of the present invention and this terminology is used only to facilitate the description.

Referring to FIG. 5, the connector body 50 defines a connector lens attachment 72 for attaching the connector 24 to the lens 12, a connector side arm attachment 74 for attaching one of the side arms 16 and 18 thereto and a connector base 76 extending therebetween. Furthermore, in some embodiments of the invention, the connector 22 includes a strip 78, seen for example in FIG. 6, which is releasably attachable to the connector body 50 and is positionable over at least a portion of the connector peripheral surface 61. In these embodiments, in some variants, the connector 24 is a composite connector 24 in which the connector body 50 is made out of a polymer and the strip 78 is made out of a metal. The strip 78 and its function will be described in further details hereinbelow.

As seen for example in FIGS. 5 and 6, the connector top surface 60 defines a top surface recess 52 extending into the connector body 50 at a location intermediate the connector first and second end surfaces 68 and 70. The top surface recess 52 has a portion thereof in the connector lens attachment 72. The connector outer surface 66 defines a flange 54 protruding upwardly from the top surface recess 52. In register with the top surface recess 52, the connector inner surface 64 extends over a smaller extent between the connector top and bottom surfaces 60 and 62 than the connector outer surface 66.

The connector lens attachment 72 includes a lens attachment proximal portion 80 and a lens attachment distal portion 82. The connector first end surface 68 is defined by the lens attachment distal portion 82. The lens attachment distal portion 82 is typically insertable into the aperture inner portion 40, while the aperture outer portion 42 receives the lens attachment proximal portion 80. The lens attachment distal portion 82 therefore extends from the lens attachment proximal portion 80, which itself extends from the connector base 76. A distance between the connector top and bottom surfaces 60 and 62 is typically larger in the lens attachment distal portion 82 than in the lens attachment proximal portion 80. The lens attachment proximal portion 80 is dimensioned so as to be substantially fittingly received within the aperture outer portion 42. Therefore, the lens attachment distal portion 82, by having dimensions larger than the lens attachment proximal portion 80, substantially prevents motions of the connector 24 in a lateral direction relatively to the lens 24.

As better seen in FIG. 7, the connector lens attachment 72 also defines, in the connector first end surface 68, a first end surface recess 84 and a first end surface protrusion 86 extending inside the first end surface recess 84. Typically, the first end surface recess 84 has a substantially U-shaped configuration opening toward the connector outer surface 66. The first end surface protrusion 86 is substantially wedge shaped and tapers in a direction leading toward the connector outer surface 66.

Referring to FIG. 8A, the connector side arm attachment 74 defines a side arm attachment recess 88 extending between the connector top and bottom surfaces 60 and 62. The side arm attachment recess 88 removably receives the side arm pin 132 thereinto and defines an attachment recess inner section 92 and an attachment recess outer section 94 extending therefrom. The attachment recess outer section 94 extends into the connector side arm attachment 74 from the connector outer surface 66. Typically, the side arm attachment recess 88 has a cross-sectional configuration that is substantially key-hole shaped and extends with a substantially uniform cross-section between the connector top and bottom surfaces 60 and 62. Therefore, the side arm attachment recess 88 defined a neck 89 between the attachment recess inner and outer sections 92 and 94. The attachment recess outer section 94 defines an attachment recess side aperture 96 leading thereinto from the connector outer surface 66. The side arm attachment recess 88 receives a portion of the side arm 18, typically a side arm pin 130, that is described in further details hereinbelow, for allowing rotation of the side arm 18 about the side arm pin 130 in the side arm pivoting plane 23. The attachment recess inner section 92 is typically substantially cylindrical and the attachment recess outer section 94 is typically substantially frusto-prismoidal and tapers in a direction leading toward the attachment recess inner section 92.

Referring to FIG. 5, the connector 24 also defines a strip receiving groove 98 for receiving a portion of the strip 78 thereinto so as to lock the strip 78 to the connector 22. The strip receiving groove 98 is located at a location intermediate the side arm attachment recess 88 and the connector lens attachment 72. The strip receiving groove 98 extends toward the connector bottom surface 62 from the connector top surface 60. The strip receiving groove 98 defines a strip receiving groove first section 100 and a strip receiving groove second section 102. The strip receiving groove second section 102 extends from the connector inner surface 64 and the strip receiving groove first section 100 extends from the strip receiving groove second section 102. The strip receiving groove second section 102 is substantially arc-segment-shaped and the strip receiving groove first section 100 is substantially L-shaped. The strip receiving groove 98 forms a substantially closed shape and, therefore, prevents movements of the strip 78 relatively to the connector 22 in the plane defined by the connector top surface 60.

The strip 78 is shaped so as to conform to the shape of the connector peripheral surface 61 over the connector first end surface 68, the connector outer surface 66, the connector second end surface 70 and part of the connector inner surface 64. The strip 78 is configured and sized for preventing removal of the side arm pin 132 from the side arm attachment recess 88 when the strip 78 is attached to the connector body 50. To that effect, as seen for example in FIG. 6, the strip 78 defines a strip first end segment 104 and a substantially opposed strip second end segment 106. A strip first intermediate segment 108 extends from the strip first end segment 104. A strip second intermediate segment 110 extends from the strip first intermediate segment 108 and a strip third intermediate segment 112 extends from the strip second intermediate segment 110. The strip second end segment 106 also extends from the strip third intermediate segment 112.

As seen in FIG. 6, the strip first end segment 104 is substantially planar and defines a strip first end segment aperture 114 extending therethrough. When the strip 78 is attached to the connector 22, the strip first end segment 104 is received inside the first end surface recess 84 and the first end surface protrusion 86 extends through the strip first end segment aperture 114. The strip first intermediate segment 108 abuts against and substantially entirely covers the connector outer surface 66. The strip second intermediate segment 110 covers the connector second end surface 70 and the strip third intermediate segment 112 covers a portion of the connector inner surface 64. The strip second end segment 106 is received inside the strip receiving groove 98.

The strip second end segment 106 includes a second end segment first section 116 and a second end segment second section 118. The second end segment second section 118 is received inside the strip receiving groove second section 102, and therefore extends from the strip third intermediate segment 112 and the second end segment first section 116 extends from the second end segment second section 118 and is therefore received by the strip receiving groove first section 100. Therefore, the second end segment first section 116 is substantially L-shaped and the second end segment second section 118 is substantially U-shaped so as to be easily received inside the strip receiving groove 98.

In some embodiments of the invention, the second end segment second section 118 has a width substantially smaller than the width of the remainder of the strip 78 and the strip receiving groove first section 100 extends away from the connector top surface 60 to a lesser extent than the strip receiving groove second section 102. This configuration of the strip receiving groove 98 and of the strip 78 guides the positioning of the strip 78 relatively to the connector 22. Also, typically, the strip 78 is dimensioned such that no portion of the strip 78 protrudes from the connector 22 relatively to the connector top and bottom surfaces 60 and 62.

Typically, the connector body 50 is made out of a polymer, which allows for manufacturing a relatively light piece using polymer manufacturing technologies that facilitate the production of this relatively complex component. The strip 78 is typically made out of a metal to bring ruggedness to the connector 24, for example by using the relatively high tensile strength of such materials, and to also be relatively easily manufacturable using sheet metal manufacturing technologies.

The side arms 16 and 18 are described with reference to the side arm 18. The side arm 16 is substantially similar to the side arm 18. As seen for example in FIG. 1, the side arm 18 defines a side arm proximal end 120 that is located substantially adjacent the connector 24 when the side arm 16 is attached to the connector 24 and a substantially opposed side arm distal end 122. A side arm body 124 extends from the side arm distal end 122 toward the side arm proximal end 120. A side arm fork 126 extends from the side arm body 124 toward the side arm proximal end 120. The side arm fork 126 defines two substantially parallel and substantially spaced apart fork legs 128. Typically, the fork legs 128 are spaced apart in a vertical direction and extend substantially longitudinally. A side arm pin 130, seen for example in FIG. 7, extends between the fork legs 128 substantially adjacent the side arm proximal end 120. The side arm pin 130 typically has a substantially cylindrical configuration.

Referring to FIGS. 12A to 12D, in some embodiments of the invention, a side arm tongue 132 extends between the fork legs 128 from the side arm body 124. The side arm tongue 132 defines a tongue first end 134 located substantially adjacent the side arm body 124 and a tongue second end 136 located substantially opposed to the tongue first end 134. The tongue second end 136 is a free end and is typically substantially spaced apart from the side arm pin 130.

The side arm tongue 132 is deformable between a tongue released and a tongue compressed configuration. In the tongue released configuration, seen for example in FIG. 12B, the side arm tongue 132 extends substantially rectilinearly. In the tongue compressed configuration, seen for example in FIG. 12C, the side arm tongue 132 is deformed relatively to the configuration of the side arm tongue 132 in the tongue released configuration and the tongue second end 136 is closer to the side arm body 124 than in the tongue released configuration. For example, the side arm tongue 132 has in this configuration a generally arcuate configuration. When the side arm tongue 132 is in the compressed configuration, the side arm tongue 132 biases the tongue second end 136 toward the position achieved by the tongue second end 136 in the tongue released configuration. The side arm tongue 132 forms a biasing element operatively coupled to the connector 24 for biasing the side arm 18 toward a side arm opened configuration, described in further details hereinbelow, or, in other words, toward the first angle interval when the side arm-to-lens angle 25 is in the second angle interval. In other words, the side arm tongue 132 is in the tongue released configuration when the side arm-to-lens angle 27 is in the first and third angle intervals, and the side arm tongue 132 is in the tongue compressed configuration when the side arm-to-lens angle is in the second angle interval, the side arm tongue 132 abutting against the connector 24 in the tongue compressed configuration to bias the side arm 18 toward the first angle interval.

Figure 12A:
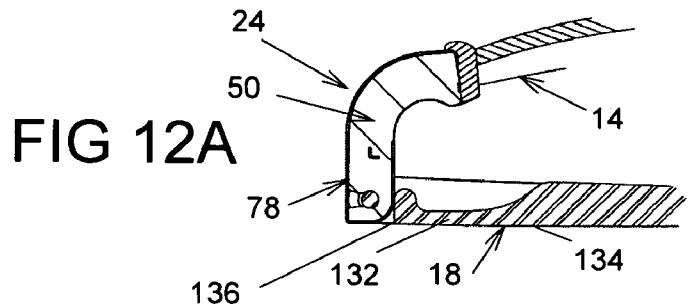
FIGS. 12A to 12D, in partial perspective views, illustrate alternative configurations of side arms part of the eyeglasses shown in FIGS. 1 and 2 relatively to the lenses of the eyeglasses shown in the same Figures.
Figure 12B:
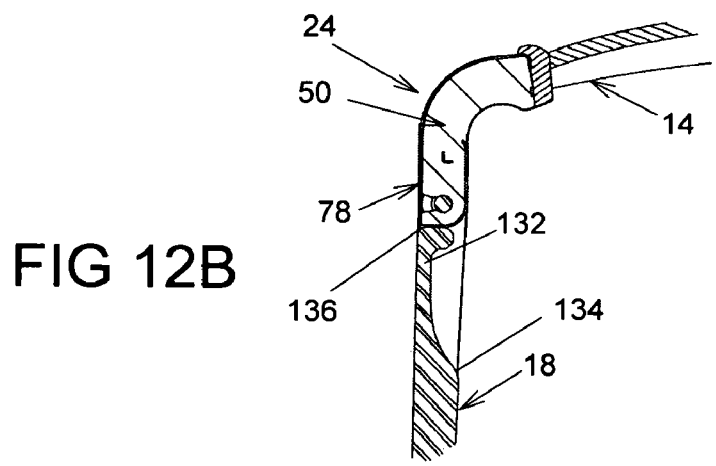

As seen in FIGS. 12A-12D, the eyeglasses 10 include side arms 16 and 18, only one of which is shown in FIGS. 12A-12D, that are operable between a closed, an opened, an extended and a released configuration. In the closed configuration, as seen in FIG. 12A, the side arms 16 and 18 are substantially adjacent and substantially parallel to the lenses 12 and 14. In this configuration, the eyeglasses 10 can be carried by the intended user in a relatively compact configuration. In the opened configuration, seen in FIG. 12B, the side arms 16 and 18 extend substantially perpendicular to the lenses 12 and 14. In this configuration, the eyeglasses 10 can be worn by the intended user in a conventional manner. In some embodiments of the invention, the side arm tongue 132 frictionally engages the connector 24 when the side arm 18 is moved between the closed and opened configurations. In these embodiments, the connector peripheral surface 61 is substantially arcuate along the path followed by the side arm tongue 132 against the connector peripheral surface 61.

Figure 12C:
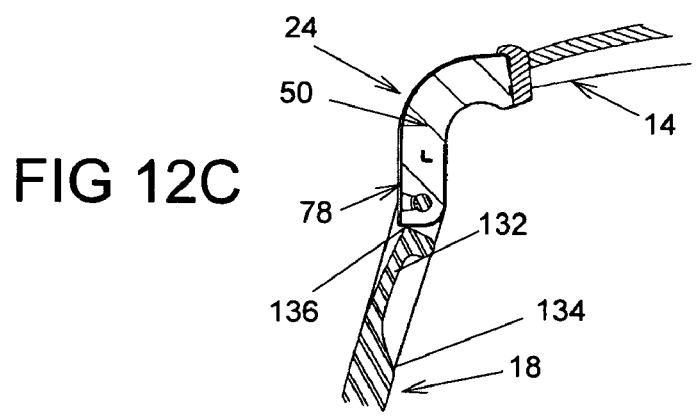
Figure 12D:
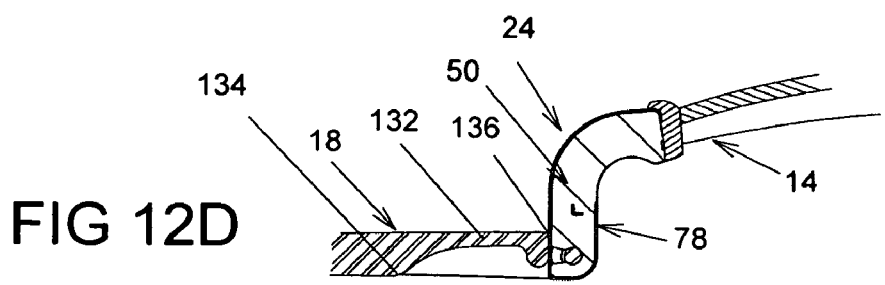

In the released configuration, seen in FIG. 12D, the side arms are located opposite to the lenses 12 and 14 relatively to the connectors 22 and 24 and extend at an angle larger than 90 degrees relatively to the lenses 12 and 14. This configuration is achieved, for example, when an impact or any other forces tending to open the side arms 16 and 18 to a larger extent than the opened configuration are exerted onto the eyeglasses 10. In some embodiments of the invention, the angle between the side arms 16 and 18 and the lenses 12 and 14 can reach a value larger than 180 degrees.

In the extended configuration, as seen in FIG. 12C, the side arms are biased against further opening of the side arms by the side arm tongue 132. The side arm tongue 132 biases the side arms 16 and 18 toward the opened configuration by abutting against the connector 24 and being deformed until a predetermined angle between the lenses 12 and 14 and the side arms 16 and 18 has been achieved. The side arm tongue 132 therefore acts as a leaf spring. The side arms 16 and 18 are therefore in the extended configuration when the side arms 16 and 18 are at an angle relatively to the lenses 12 and 14 comprised between the angle corresponding to the opened position and the predetermined angle. After this predetermined angle has been achieved, the side arm tongue 132 no longer biases the side arms 16 and 18 and the side arms 16 and 18 are free to rotate toward the released configuration. The transition toward this later configuration proceeds through a snapping action of the side arm tongue 132.

As seen in FIG. 4, the locking component 28 defines a locking component first end 138 and a substantially longitudinally opposed locking component second end 140. The locking component 28 defines a locking component body 142 extending from the locking component first end 138. A locking component head 144 extends from the locking component body 142 toward the locking component second end 140. The locking component head 144 defines a locking component flange 146 extending substantially radially outwardly further away than the locking component body 142. Also, the locking component 28 defines locking component grooves 148 extending substantially longitudinally along the locking component body 142. The locking component grooves 148 extend from the locking component first end 138 toward the locking component second end 140 and are interrupted at a location substantially spaced apart from the locking component head 144.

In some embodiments of the invention, the locking component grooves 148 are interlinked by a circumferential groove 148' located substantially adjacent to the locking component head 144. Also, the locking component body 142 has a substantially hemicylindrical configuration and defines an arcuate surface 150 and a planar surface 152 extending therefrom. The planar surface 152 defines a locking component protrusion 154 having a substantially wedge shape tapering toward the locking component first end 138. The locking component protrusion 154 and the first end surface protrusion 86 together form a substantially parallelepipedic shape when the eyeglasses 10 are assembled and engage each other to snap inside the first end surface recess 84 to lock the connector 24 to the lens 14.

In use, the eyeglasses 10 are assembled as follows with reference to FIGS. 6-10. First, referring to FIGS. 6 and 7, the strip 78 is mounted to the connector body 50. To that effect, the strip second end segment 106 is inserted inside the strip receiving groove 98 and the strip 78 is partially wrapped around the connector peripheral surface 61. More specifically, the strip third intermediate segment 112 is positioned so as to abut against the connector inner surface 64 and the strip second intermediate segment 110 is positioned so as to abut against the connector second end surface 70. Then, as seen in FIG. 7, the strip first intermediate segment 108 is spaced apart from the connector outer surface 66 so as to allow the insertion of the side arm pin 130 therebetween. The side arm pin 130 is then inserted inside the side arm attachment recess 88. The tapered configuration of the attachment recess outer section 94 guides the side arm pin 130 toward the attachment recess inner section 92. Typically, the attachment recess inner and outer sections 92 and 94 are dimensioned such that the side arm pin 130 snaps in place inside the attachment recess inner section 92 where it is substantially free to rotate.

Afterwards, as seen in FIG. 10, the strip 78 is positioned such that the strip first intermediate segment 108 abuts against the connector outer surface 66 and the strip first end segment 104 is received within the first end surface recess 84 with the first end surface protrusion 86 protruding through the strip first end segment aperture 114. Typically, the strip first, second and third intermediate segments 108, 110 and 112 are dimensioned such that, in this position, the strip 78 is relatively firmly attached to the connector 24. The reader skilled in the art will readily appreciate that, in this position, the strip 78 locks the attachment recess side aperture 96, thereby preventing the side arm 18 from being removed from the connector 24.

Figure 11B:
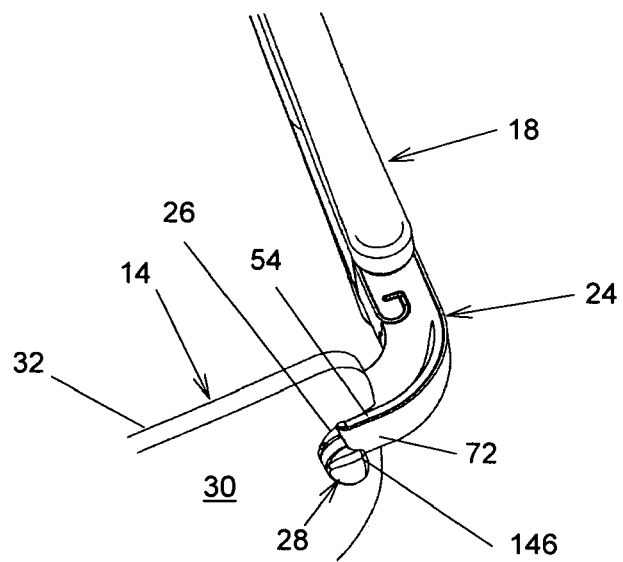
Figure 11C:
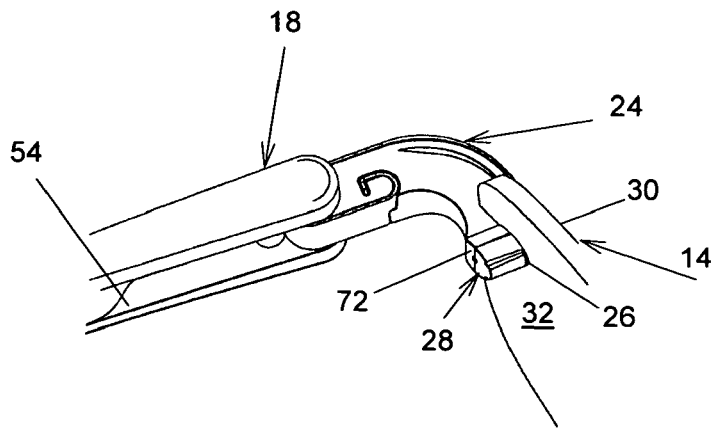

Then, with reference to FIGS. 11A-11C, the connector 24 and all the other components of the eyeglasses 10 that are attachable to the lenses 12 and 14 can be attached to the lens 14 by inserting the connector lens attachment 72 inside the lens aperture 26 in a movement leading from the lens first surface 30 toward the lens second surface 32, as seen in FIG. 11A. Once the connector 24 has been suitably positioned relatively to the lens 12, the locking component 28 is also inserted inside the lens aperture 26, as seen in FIG. 11B. Typically, the locking component 28 is inserted from the lens first surface 30 toward the lens second surface 32. The locking component 28 and the connector 24 are inserted in the lens 14 until the flange 54 and the locking component flange 146 abut against the lens first surface 30. Then, glue is inserted into the locking component grooves 148. The glue fills out the locking component grooves 148 through capillarity.

If relatively weak glue has been used, removal of the connector 24 from the lens 14 is relatively easily performed by pushing on the locking component 28. In other embodiments, the locking component 28 is relatively firmly glued to the lens 14. In these embodiments, the locking component 28 can be simply destroyed, for example using a drill bit or by cutting off the locking component head 144, to allow removal of the connector 24 from the lens 14. Since the locking component 28 is relatively small and relatively easily manufacturable, this component can be considered disposable. In both cases, removal of the connector 24 from the lens 14 is performed without incurring unnecessarily large costs to the intended user of the eyeglasses as the lens and the connector are not damaged by this action.

After the eyeglasses 10 have been assembled, the intended user of the eyeglasses 10 can move the side arms 16 and 18 from the closed configuration to the opened configuration. Then, the intended user may position the eyeglasses 10 in a conventional manner onto his face. If relatively small forces are exerted onto the side arms 16 and 18, pushing them away from the lenses 12 and 14, the side arm tongue 132 deforms toward the compressed configuration and, therefore, biases the side arms 16 and 18 toward the opened configuration. This deformation is caused as the tongue second end 136 slides on the strip second intermediate segment 110. This deformation occurs because the centre of rotation of the side arms 16 and 18, which is located in the middle of the side arm attachment recess 88, is eccentric relatively to the centre of curvature of the strip second intermediate segment 110. Relatively small forces exerted onto the side arms 16 and 18 result in relatively easily reversible movements of the side arms 16 and 18 relatively to the lenses 12 and 14. Also, in some embodiments of the invention, the side arms 16 and 18 are similarly biased toward the open configuration in response to relatively small forces directed toward the closed configuration.

If the position of the side arms 16 and 18 reaches a predetermined angle or, alternatively, if a predetermined force is exerted onto the side arms 16 in a direction such that the side arms 16 and 18 are pushed away from the lenses 12 and 14, the side arms 16 and 18 will reach a position at which the side arm tongues 132 no longer abut against the strip second intermediate segment 110. In this position, the side arm tongue 132 deforms back to the uncompressed configuration and the side arms 16 and 18 are freely rotatable relatively to the connectors 22 and 24. Because of the strip 78, the side arms 16 and 18 cannot be removed from the connectors 22 and 24 and the side arms 16 and 18 will therefore only pivot freely without detaching, which may prevent damaging the eyeglasses 10. To get the side arms 16 and 18 back to the opened configuration, the intended user can simply move the side arm 16 and 18 toward the opened configuration, with or without pushing against the side arm tongue 132.

Referring to FIG. 13, there is shown a pair of eyeglasses 210 in accordance with an alternative embodiment of the invention. The eyeglasses 210 are similar to the eyeglasses 10 and only the differences between the eyeglasses 210 and 10 are described in details herein. The eyeglasses 210 includes side arms 216 and 218, instead of the side arms 16 and 18, and connectors 222 and 224, instead of connectors 22 and 24.

Figure 17A:
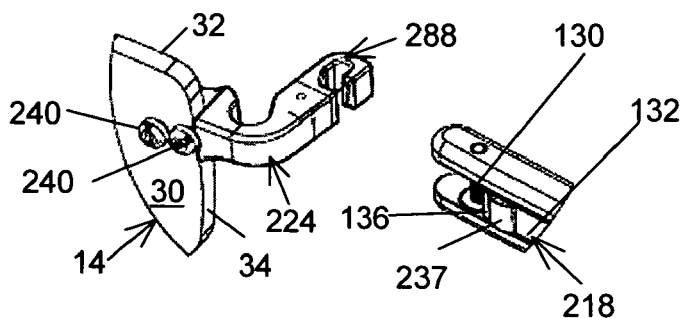
FIGS. 17A to 17E, in partial perspective views, illustrate successive steps in the attachment of the side arm shown in FIG. 16 to the connector of the eyeglasses shown in FIG. 13.

Referring to FIG. 17A, for example, the attachment between the lens 14 and the connector 224 is illustrated in greater details. The lens 12 is attached to the connector 222 in a similar manner and this attachment is therefore not described in further details herein. The connector 224 is attached to the lens using fasteners 240, such as screws, engaging corresponding apertures (not shown in the drawings) present in the connector 224 and the lens 14. In alternative embodiments of the invention, as described in further details hereinbelow, an alternative connector 224' includes pins that engage the apertures and which are fastened to the lens 14 using, for example, a nut (not shown in the drawings) or glue, among other possibilities. The connectors 224 and 224' are substantially similar to each other, except for the manner in which they are attached to the lens 14.

FIGS. 14 and 15 illustrate in greater details the connector 224'. The other connector used to engage the lens 12 is similar to the connector 224' and is therefore not described in further details. The connector 224' is generally L-shaped and defines a connector top surface 260, a substantially opposed connector bottom surface 262, a connector outer surface 266 extending between the connector top and bottom surfaces 260 and 262, a connector inner surface 264 extending also between the connector bottom and top surfaces 262 and 260 and two substantially opposed connector first and second end surfaces 268 and 270 also each extending between the connector top and bottom surfaces 260 and 262. The connector outer surface 266, inner surface 266, first end surface 268 and second end surface 270 together form a connector peripheral surface 261 extending between the connector top and bottom surfaces 260 and 262. The connector peripheral surface 261 defines a side arm interference section 263 at the intersection of the connector outer and second end surfaces 266 and 270. The connector inner and outer surfaces 64 and 66 are substantially opposed to each other and each extend between the connector first and second end surfaces 268 and 270.

The connector outer surface 266 faces laterally outwardly relatively to the lenses 12 and 14 when the eyeglasses 210 are assembled. The connector inner surface 264 faces laterally inwardly relatively to the lenses 12 and 14 when the eyeglasses 210 are assembled. Therefore, the connector inner surfaces 264 of connectors 222 and 224 face each other when the eyeglasses 210 are assembled. The connector first end surface 268 is located adjacent to the lens 14 when the eyeglasses 210 are assembled.

The connector 224' defines a connector lens attachment 272 for attaching the connector 224' to the lens 14, a connector side arm attachment 274 for attaching one of the side arms 216 and 218 thereto and a connector base 276 extending therebetween. In some embodiments of the invention, the connector side arm attachment 274 is substantially hook-shaped The connector lens attachment 272 includes a lens attachment body 273 that is substantially plate-shaped, although other shapes for the lens attachment body 273 are within the scope of the present invention. A proximal pin 280 extends substantially perpendicularly from the lens attachment body 273 generally toward the side arm attachment 274 substantially adjacent to the connector first end surface 268. A distal pin 282 extends substantially parallel to the proximal pin 280 substantially adjacent thereto further away from the connector first end surface 268 than the proximal pin 280. The proximal and distal pins 280 and 282 are insertable in corresponding apertures in the lens 14 (not shown in the drawings).

The connector side arm attachment 274 defines a side arm attachment recess 288 extending between the connector top and bottom surfaces 260 and 262. As better seen in FIG. 14, the side arm attachment recess 288 defines an attachment recess inner section 292, an attachment recess intermediate section 293 extending from the attachment recess inner section 292 and an attachment recess outer section 294 extending from the attachment recess intermediate section 293. The attachment recess outer section 294 extends into the connector side arm attachment 274 from the connector outer surface 266. Typically, the side arm attachment recess 288 has a cross-sectional configuration that is substantially L-shaped with a substantially constant width therealong. More specifically, the attachment recess inner section and outer sections 292 and 294 are substantially perpendicular to each other and the attachment recess intermediate section 293 is angled with respect to both the attachment recess inner and outer sections 292 and 294

The attachment recess outer section 294 defines an attachment recess side aperture 296 leading thereinto from the connector outer surface 266. The side arm attachment recess 288 receives a portion of the side arm 218, typically the side arm pin 130. The attachment recess inner section 292 is typically substantially half-oval-shaped in cross-section and oriented substantially parallel to the proximal and distal pins 280 and 282. The attachment recess intermediate and outer sections 293 and 294 are typically substantially rectilinear with longitudinal axes that are respectively angled at less than 90 degrees and perpendicular with respect to the connector outer surface 266.

Referring to FIG. 16, the side arms 216 and 218 are described with reference to the side arm 218. The side arm 216 is substantially similar to the side arm 218. The side arm 218 is also substantially similar to the side arm 18 and structures that have similar functions in the two side arms 18 and 218 are identified by the same reference numerals.

Figure 17D:
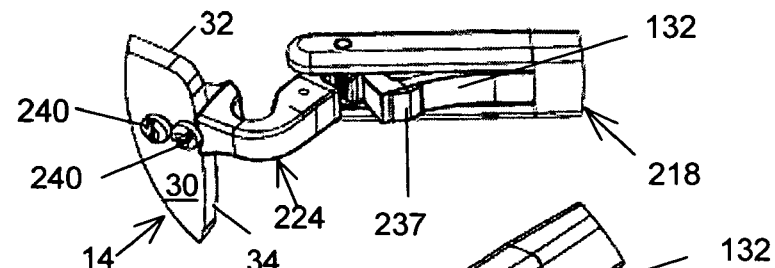
Figure 17E:
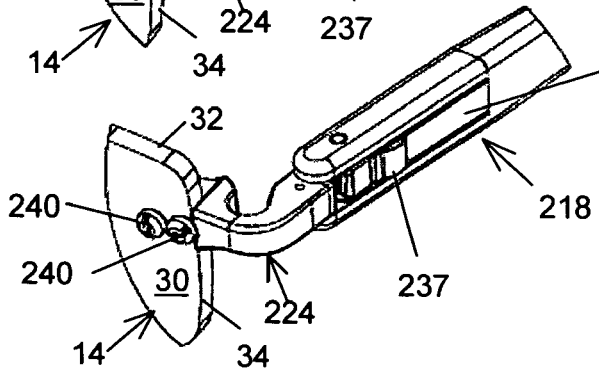
Figure 18A:
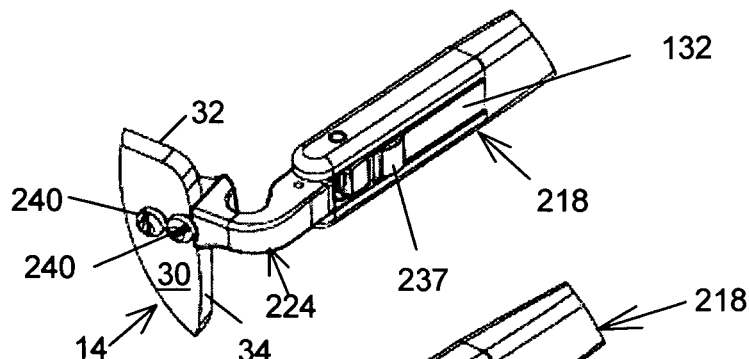
FIGS. 18A to 18E, in partial perspective views, illustrate successive steps in the detachment of the side arm shown in FIG. 16 from the connector of the eyeglasses shown in FIG. 13.
Figure 18B:
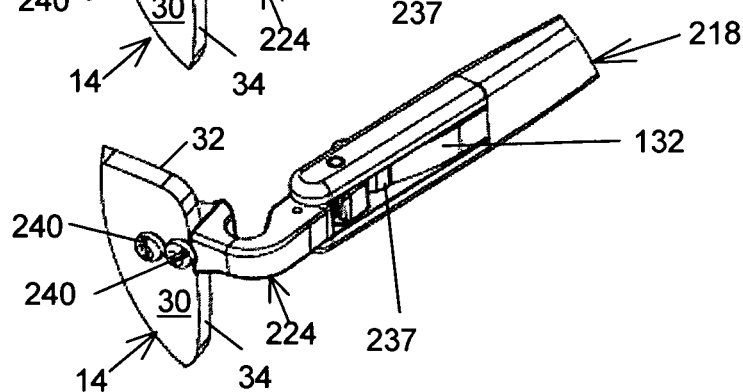
Figure 18C:
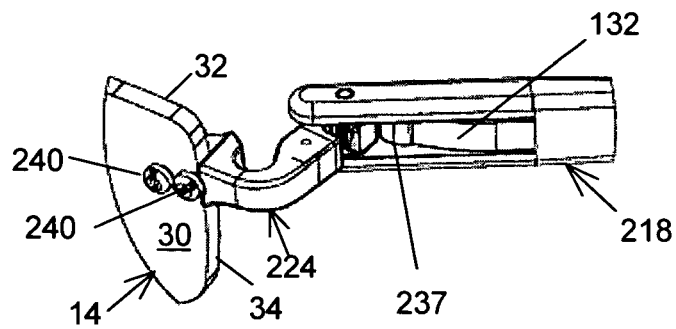

The side arm tongue 132 is deformable between a tongue released, a tongue compressed and a tongue deformed configuration. In the tongue released configuration, seen for example in FIG. 16, the side arm tongue 132 extends substantially rectilinearly. In the tongue compressed configuration, seen for example in FIG. 18C, the side arm tongue 132 is deformed relatively to the configuration of the side arm tongue 132 in the tongue released configuration and the tongue second end 136 is closer to the side arm body 124 than in the tongue released configuration, the side arm tongue 132 being deflected in a direction leading generally toward the inside of the eyeglasses 210. For example, the side arm tongue 132 has in this configuration a generally arcuate configuration. In the tongue deformed configuration, seen for example in FIG. 17D, the side arm tongue 132 is deformed relatively to the configuration of the side arm tongue 132 in the tongue released configuration and the tongue second end 136 is closer to the side arm body 124 than in the tongue released configuration, the side arm tongue 132 being deflected in a direction leading generally away from the inside of the eyeglasses 210. For example, the side arm tongue 132 has also in this configuration a generally arcuate configuration.

The deflection of the side arm tongue 132 between the tongue released, compressed and deformed configurations is required for attachment to and detachment from the connector 224. To achieve this functionality, a distance between the tongue second end 136 and the side arm pin 130 is smaller in the tongue released configuration than a distance between the side arm interference section 263 and the attachment recess inner section 292.

FIGS. 17A to 17E illustrate a sequence of operations leading to the attachment of the side arm 218 to the connector 224. First, the side arm 218 is positioned so that its longitudinal axis substantially perpendicular to the side arm attachment 274, or, in other words, so that the side arm 218 extends laterally outwardly with respect to the eyeglasses 210. Then, keeping this orientation, the side arm pin 130 is inserted into the attachment recess outer section 294 through a longitudinal movement through the side aperture 296. Afterwards, while keeping the same relative orientation between the side arm 218 and the side arm attachment 274, the side arm pin 130 is slid successively through the attachment recess intermediate section 293 and the attachment recess inner section 294.

Subsequently, the side arm tongue 132 is moved to the tongue outer deformed configuration and the side arm 218 is pivoted around the side arm pin 130 until the side arm 218 extends substantially longitudinal with respect to the side arm attachment 274. The side arm tongue 132 is moved to the tongue outer deformed configuration either by having an intended user of the eyeglasses 210 manually move the tongue second end 136, or by simply pivoting the side arm 218 which, through an interaction of the side arm tongue 132 and the side arm interference section 263, performs a deformation of the side arm tongue 132. After this process has been terminated, the side arm 218 is locked to the connector 224 as interference between the side arm tongue 132 and the side arm interference section 263 prevents easy movement of the side arm pivotally outwardly with respect to the eyeglasses 210. The relatively gently curving structure of the side arm attachment recess 288 guides movement of the side arm pin 130 to facilitate attachment of the side arm 218 to the connector 224.

Detachment of the side arm 218 from the connector 224 is performed by reversing the above steps, with the exception that the side arm tongue 132, to allow outward movement the side arm 218 with respect to the eyeglasses 210, is first deformed to the tongue compressed configuration, typically by having an intended user push on the side arm tongue 132 substantially adjacent to the tongue second end 136. To facilitate this process, in some embodiments of the invention, the side arm tongue is provided substantially adjacent the tongue second end with a protrusion 237 protruding outwardly therefrom. Afterwards, pivotal movement can be performed and leads to detachment of the side arm 218 from the connector 224.

More generally, the present invention relates to eyeglasses in which side arms 216 and 218 each include a deformable element, for example the side arm tongue 132, substantially resiliently deformable between a released configuration and a deformed configuration.

Figure 17B:
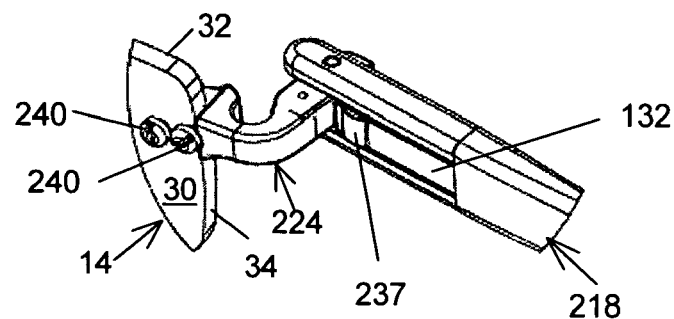
Figure 17C:
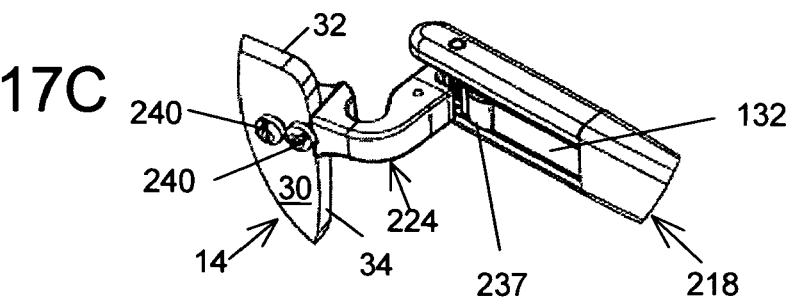
Figure 18D:
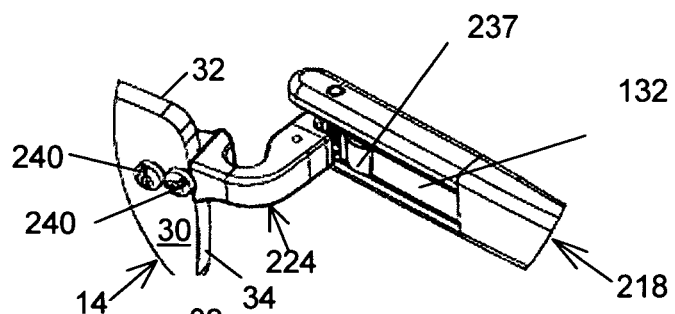
Figure 18E:
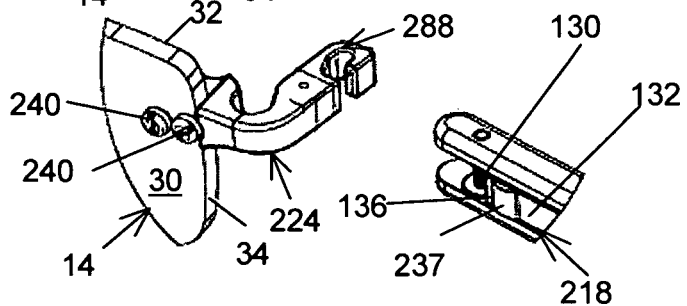

With the side arm pin 130 inserted in the side arm attachment recess 288, the side arms 216 and 218 are each pivotable about the side arm pin 130 between a locked position (seen for example in FIGS. 17E and 18A), and an unlocked position (seen for example in FIGS. 17B and 18D). In the locked position, the eyeglasses 210 are wearable by an intended user. In the unlocked position, the side arms 216 and 218 extend laterally outwardly with respect to the eyeglasses 210. The side arm pin 130 is removable from the side arm attachment recess 288 in the unlocked position and the side arm pin 130 is locked in the side arm attachment recess 288 in the locked position. The side arms 216 and 218 are movable between the locked and unlocked positions when the deformable element is in the deformed configuration. The side arms 216 and 218 are substantially prevented from moving between the locked and unlocked positions when the deformable element is in the released configuration.

While the above eyeglasses 210 are rimless eyeglasses, the present configuration of the side arms 216 and 218 and their attachment to the remainder of the eyeglasses is also usable in rimmed eyeglasses. Also, the side arms 216 and 218 are typically operable in a conventional manner so as to fold to allow easy storage of the eyeglasses 210.

Although the present invention has been described hereinabove by way of preferred embodiments thereof, it can be modified, without departing from the spirit and nature of the subject invention as defined in the appended claims.

What is claimed is:

1. Eyeglasses, said eyeglasses defining substantially opposed eyeglasses lateral sides, said eyeglasses comprising:
    a pair of lenses provided in a substantially side-by-side relationship relative to each other between said eyeglasses lateral sides;
    a pair of connectors each provided substantially adjacent a respective one of said eyeglasses lateral sides; and
    a pair of side arms, each of said side arms being pivotally coupled to a respective one of said connectors so as to be pivotable in a respective side arm pivoting plane, said side arms defining each a respective side arm-to-lens angle in said respective side arm pivoting plane between said side arms and said lenses;
    said side arms being each pivotable in said side arm pivoting plane over a respective side arm range of motion, said side arm range of motion defining a first, a second and a third angle interval, wherein:
        said side arms are substantially freely pivotable when said side arm-to-lens angle is in said first angle interval;
        said second angle interval includes angles larger than angles of said first angle interval and said side arm is biased toward said first angle interval when said side arm-to-lens angle is in said second angle interval; and
        said third angle interval includes angles larger than angles in said second angle interval and said side arm is substantially freely pivotable when said side arm-to-lens angle is in said third angle interval
    each of said side arms defining a side arm proximal end located substantially adjacent said connector, a side arm distal end substantially opposed to said side arm proximal end, a side arm body extending from said side arm distal end toward said side arm proximal end and a side arm pin provided substantially adjacent said side arm proximal end;
    each of said connectors defining a connector body, said connector body defining a side arm attachment recess for removably receiving said side arm pin thereinto and allowing rotation of said side arm about said side arm pin in said side arm pivoting plane, said side arms being removably attachable to said connectors;
    said side arms each including a deformable element substantially resiliently deformable between a released configuration and a deformed configuration;
    wherein, with said side arms attached to said connectors, for each of said side arms and for said connector to which said each of said arms is pivotally coupled, said side arm is pivotable about said pin between a locked position and an unlocked position, said pin being removable from said attachment recess in said unlocked position and said pin being locked in said attachment recess in said locked position, said side arm being movable between said locked and unlocked positions when said deformable element is in said deformed configuration, said side arm being substantially prevented from moving between said locked and unlocked positions when said deformable element is in said released configuration.

2. Eyeglasses as defined in claim 1, wherein each of said deformable elements acts as a biasing element and is operatively coupled to a respective one of said connectors for biasing said side arms toward said first angle interval when said side arm-to-lens angle is in said second angle interval.

3. Eyeglasses as defined in claim 1, wherein each of said side arms includes a biasing element operatively coupled to said connectors for biasing said side arms toward said first angle interval when said side arm-to-lens angle is in said second angle interval.

4. Eyeglasses as defined in claim 1, wherein each of said side arms defines a side arm fork extending from said side arm body toward said side arm proximal end, said side arm fork defining two substantially parallel and spaced apart fork legs, said side arm pin extending between said fork legs substantially adjacent said side arm proximal end.

5. Eyeglasses as defined in claim 4, wherein each of said side arms defines a side arm tongue extending between said fork legs from said side arm body, said side arm tongue defining a tongue first end located substantially adjacent said side arm body and a tongue second end substantially opposed to said tongue first end, said tongue second end being a free end and substantially spaced apart from said side arm pin, said side arm tongue being deformable between a tongue released configuration and a tongue compressed configuration, said side arm tongue being in said tongue released configuration when said side arm-to-lens angle is in said first and third angle intervals, and said side arm tongue being in said tongue compressed configuration when said side arm-to-lens angle is in said second angle interval, said side arm tongue abutting against said connector in said tongue compressed configuration to bias said side arm toward said first angle interval, said side arm tongue being part of said deformable element.

6. Eyeglasses as defined in claim 5, wherein, in said tongue released configuration, said side arm tongue extends substantially rectilinearly and in said tongue compressed configuration, said side arm tongue is deformed relatively to said tongue released configuration and said tongue second end is closer to said side arm body than in said tongue released configuration.

7. Eyeglasses as defined in claim 6, wherein, in said tongue compressed configuration, said side arm tongue has a generally arcuate configuration.

8. Eyeglasses as defined in claim 6, wherein said connector body defines substantially opposed connector first and second end surfaces, said connector first end surface being substantially adjacent said lenses, said connector body also defining substantially opposed connector inner and outer surfaces each extending between said connector first and second end surfaces, said connector outer surface facing laterally outwardly and said connector inner surface facing laterally inwardly with respect to said eyeglasses, said connector second end and inner surfaces merging together in a substantially arcuate configuration and said connector second end and outer surfaces merging together in a substantially corner-shaped configuration.

9. Eyeglasses as defined in claim 1, wherein said side arm attachment recess defines an attachment recess inner section and an attachment recess outer section extending therefrom, said attachment recess outer section extending substantially laterally inwardly into said connector, said side arm attachment recess defining a neck between said attachment recess inner and outer sections.

10. Eyeglasses as defined in claim 9, wherein said attachment recess has a substantially key-hole shaped cross-sectional configuration in a plane perpendicular to said side arm pin.

11. Eyeglasses as defined in claim 9, wherein said attachment recess has a substantially uniform cross-sectional configuration over all planes perpendicular to said side arm pin that intersect said side arm pin.

12. Eyeglasses as defined in claim 1, wherein said connector includes a strip removably attachable to said connector body, said strip being configured and sized for preventing removal of said side arm pin from said side arm attachment recess when said strip is attached to said connector body.

13. Eyeglasses as defined in claim 12, wherein said connector is a composite connector in which said connector body is made out of a polymer and said strip is made out of a metal.

14. Eyeglasses as defined in claim 1, wherein for each of said connectors, said side arm attachment recess defines an attachment recess inner section, an attachment recess intermediate section extending from said attachment recess inner section and an attachment recess outer section extending from said attachment recess intermediate section, said attachment recess outer section extending substantially laterally inwardly into said connector, said attachment recess inner and outer sections being substantially perpendicular to each other and said attachment recess intermediate section being angled with respect to both said attachment recess inner and outer sections 15. Eyeglasses as defined in claim 14, wherein said side arm attachment recess has a cross-sectional configuration that is substantially L-shaped with a substantially constant width therealong.

16. Eyeglasses as defined in claim 1, wherein said side arm pin has a substantially cylindrical configuration.

17. Eyeglasses as defined in claim 1, wherein each of said connectors defines a lens attachment for attaching said connectors to a respective one of said lenses.

18. Eyeglasses as defined in claim 1, wherein said side arm pivoting plane extends generally perpendicularly to said lenses.

* * * * *